United States Patent [19]
Cornell et al.

[11] 3,831,134
[45] Aug. 20, 1974

[54] CABLE CLAMP WITH NON-SHEARING JAWS

[75] Inventors: Paul A. Cornell, Knockanore, Ireland; Lynn H. Latta, Pismo Beach, Calif.

[73] Assignee: Electro-Clamp Corporation, Beverly Hills, Calif.

[22] Filed: June 15, 1973

[21] Appl. No.: 370,393

[52] U.S. Cl. .......................................... 339/266 R
[51] Int. Cl. ............................................. H01r 7/08
[58] Field of Search........ 339/266 R, 263, 274, 249; 24/132 AA, 132 AB, 132 AC, 132 PT, 132 R, 115 G; 403/274, 279

[56] References Cited
UNITED STATES PATENTS

| | | | |
|---|---|---|---|
| 3,118,720 | 1/1964 | Shuck et al. | 339/266 R |
| 3,351,889 | 11/1967 | Lawlor et al. | 339/266 R |
| 3,406,372 | 10/1968 | Lawlor | 339/266 R |

*Primary Examiner*—James R. Boler
*Assistant Examiner*—Peter Nerbun
*Attorney, Agent, or Firm*—Hume, Clement, Brinks, Willian, Olds & Cook, Ltd.

[57] ABSTRACT

A cable clamp of the type exbodying rotatably coupled male and female clamping members with respective tails adapted to be secured together to effect clamping action, is particularly characterized by arching of diametrically opposed cheeks of the female member away from opposite sides of the cylindrical male member which are in radially opposed relation to such cheeks, the male member being provided with a bore extending diametrically therethrough and the cheeks of the female member having openings which, in an open position of the clamp, are aligned with the bore of the male member so as to receive the end of the cable; the arching of the cheeks providing pockets between the cheeks and the opposed surfaces of the male member, in which the traversing portions of the cable, in response to closing of the clamp, will be distorted into offset bends without any shearing action which would weaken the cable.

10 Claims, 8 Drawing Figures

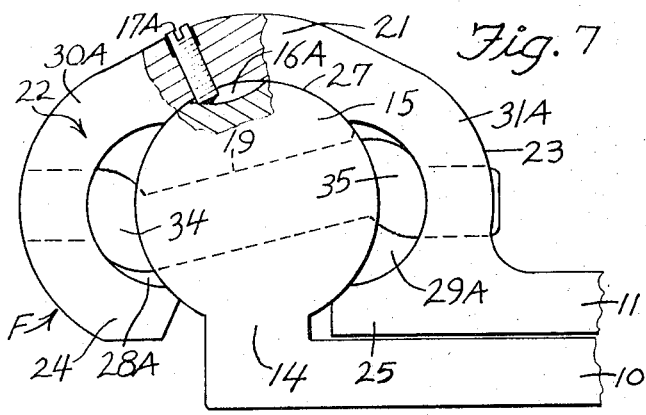
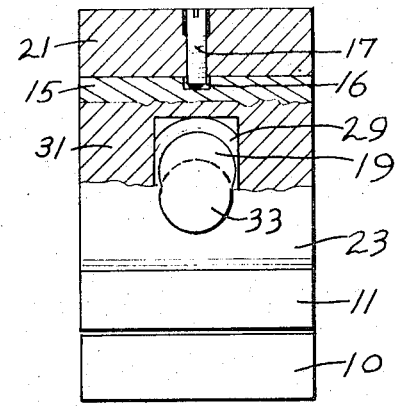
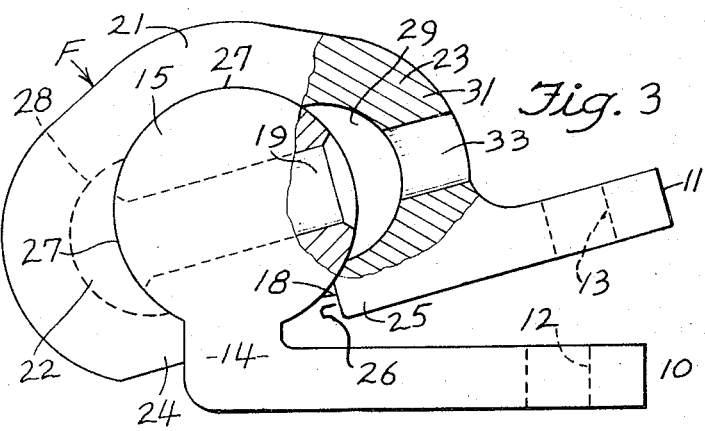
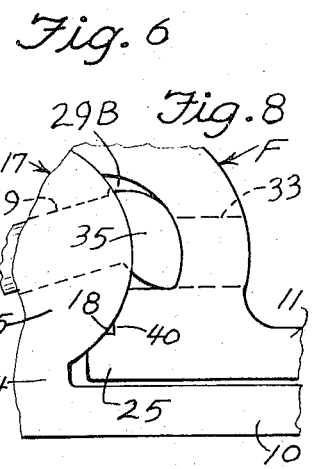
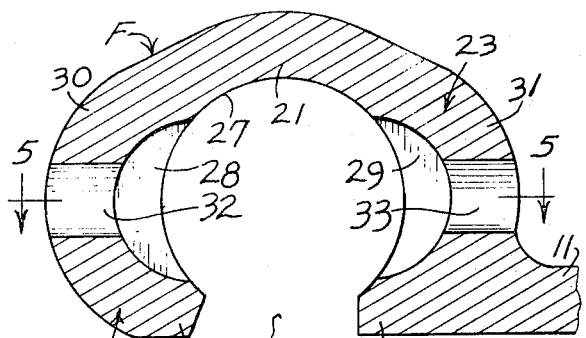
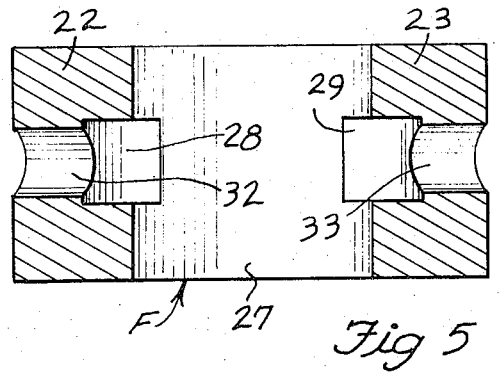
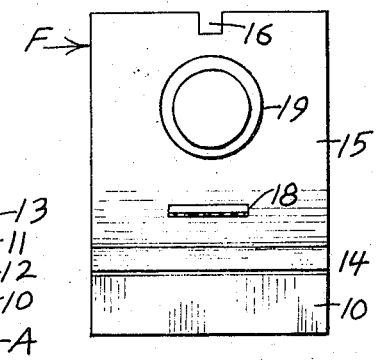

CABLE CLAMP WITH NON-SHEARING JAWS

BACKGROUND OF THE INVENTION

Cable clamps, especially useful as electrical connectors, are known in the art as disclosed in Schuck et al. U.S. Pat. No. 3,118,720. Such clamps embody male and female cylindrical jaw members having respective diametrical bores which, in an open position of the clamp, are aligned to rereceive a cable (e.g., conductor) and which, in a closed position of the clamp, are offset so as to produce bends in the cable, thereby clamping the cable to the clamp. As the cylindrical loop of the female member rotates around the cylindrical head of the male member, the clamping action becomes a partial shearing action which weakens the cable at the areas of clamping action. Attempts to reduce the shearing action have been made by introducing a tubular liner of soft, deformable metal between the clamping jaws and the cable, as in Lawlor U.S. Pat. No. 3,138,422, and by substituting a throat of X section instead of the cylindrical bore of the male member, as in Lawlow U.S. Pat. No. 3,406,372. But while such devices reduce the shearing effect to some extent, they do not fully eliminate it, and they also reduce the clamping grip of the jaws on the cable, which is an undesirable effect.

SUMMARY OF THE INVENTION

The present invention, instead of attempting to attain a tight clamping action upon the cable, as the means for securing the cable, relies principally upon the development of two deformed portions of the cable which are received in diametrically opposed pockets in the opposite cheeks of the female member, with no reduction in cable thickness by shearing action or otherwise, in the deformed portions of the cable. In the preferred form of the invention, the respective clamp members can be fabricated wholly by slicing off sections of extrusions, except that boring must be utilized for forming the cable receiving bores in the jaw members and the bolt holes in the tails. To be able to form the jaw members by extrusion and slicing, without the necessity for machining other than the boring, results in a great reduction in fabrication cost.

The general object of this invention is to provide a non-shearing cable clamp of minimum production cost.

Other objects will become apparent in the ensuing specifications and appended drawings, in which:

FIG. 1 is a cross-sectional view of a cable clamp embodying the invention, shown in the closed position with a cable end clamped therein;

FIG. 2 is an end view of the same;

FIG. 3 is a side view of the same, partially in section, shown in the open cable-receiving position;

FIG. 4 is a fragmentary sectional view of the female jaw member;

FIG. 5 is a transverse sectional view of the same, taken on the line 5—5 of FIG. 4;

FIG. 6 is a tail end view of the same, partially in section as indicated by line 6—6 of FIG. 1;

FIG. 7 is a side elevation of the preferred form of the invention; and

FIG. 8 is a fragmentary side view of another modification.

DESCRIPTION

Referring now to the drawing in detail, I have shown in FIGS. 1–5 thereof, as an example of one form in which the invention may be embodied, a cable clamp comprising, in general, male and female jaw members M and F, each having a tail, 10 and 11 respectively, provided with bolt holes 12 and 13 adapted to register to receive a bolt B for securing the jaws in closed position.

Male jaw member M has a neck 14 extending transversely from the end of tail 10 remote from bolt hole 12. Neck 14 carries a cylindrical trunnion head 15, spaced from the plane of tail 10. In the top of head 15 is a milled slot 16 which receives the end of a key (retainer screw) 17 threaded through female member F. A latching tooth 18 (FIG. 2) projects from the periphery of head 15 approximately midway between tail 10 and a diametrical bore 19 in head 15.

Female jaw member F comprises the tail 11, a yoke 20 including an arched web 21 joining the two side arms 22 and 23, and the retainer screw 17 threaded through the arched web 21 and received in slot 16 in male head 15. Arm 23 is integrally joined to tail 11 and projects transversely thereof. Arms 22 and 23 terminate in opposed fingers 24, 25 projecting toward one another and separated by a gap 26 which receives neck 14 with clearance sufficient to allow female member F to move to its respective open and closed positions. Finger 25 is an aligned extension of tail 11. Web 21, arms 22 and 23, and fingers 24, 25 cooperatively define a cylindrical socket 27 in which male head 15 is rotatably received and retained. Engagement of finger 24 against neck 14 functions to limit the opening movement of the clamp.

Internal crescent-shaped recesses 28 and 29 are milled into the inner sides of arms 22 and 23 to a width approximately equal to the diameter of bore 19. Arcuate cheeks 30 and 31 are defined outwardly of the recesses 28, 29. In the centers of cheeks 30, 31 are bores 32, 33 which, when the clamp is in the open position shown in FIG. 3, are aligned with the male head bore 19 for reception of a cable (e.g., conductor) C. When the clamp is brought to the closed position (FIG. 1) the cable C will be deformed in the recesses 28, 29 to produce offset bends 34 and 35 having retaining shoulders clamped tightly by jaws 36, 37 against cheek 30 and head 15 respectively so as to lock the cable securely against tension loads tending to pull the cable out of the clamp through cheek 30. After the clamp is closed, it may be secured by a bolt or screw passed through bolt holes 12, 13 and anchored in body M (any member to which the clamp may be secured, either a fixed mount or otherwise, e.g., another clamp). Latching tooth 18, which is short enough to enter recess 29, will wedge the fingers 24, 25 apart as the female member F is moved to the closed position, and at the closed position it will enter recess 29 and allow finger 25 to spring back to the normal position shown in FIG. 1, to hold the clamp closed until the bolt or screw B is applied. In the open position of the clamp, tooth 18 will lock against the end of finger 25 to hold the clamp in that position, as shown in FIG. 3.

In closing the clamp, the offset bends 34, 35 will be formed without appreciable shearing action, the recesses 28 being of such depth, radially, that the opposed clamping jaws 36 and 38, 37 and 39 will not approach one another substantially closer than the diameter of cable C at any time during closing movement. Thus the deforming action is substantially a purely bending action, without penetration into the cable.

The avoidance of the weakening action of shearing is of particular importance at the side of the clamp to which the cable tension is applied (e.g., at the leftward side of FIG. 1). The objects of the invention can be largely achieved by utilizing the recess 28 only, with the arm 31 at the other side of the clamp in close proximity to the cylindrical surface of male head 15 throughout its arcuate extent, and the invention contemplates such a clamp having the non-shearing feature only at the side where the cable tension is applied. In such a construction, the tip end of the cable, even though partially sheared at the bend 35, would assist in holding the cable from slipping at the bend 34 where the full cable tension is applied. However, in the preferred form of the invention, shown in FIG. 7, the holding power of the bend 35, which is unsheared, is utilized to attain maximum cable anchorage. The lateral cheeks 30A, 31A, the recesses 28A, 29A, and a recess 16A in head 15, extend full thickness through arms 22A, 23A, being formed in the same extrusion operation as the peripheral contours of clamp members F and M. Thus a considerable saving in production cost is attained. In lieu of latching tooth 18 for holding the female member F in the closed position until a fastener B is applied, there is provided a screw 17A, normally retracted so that its inner end clears the cylindrical periphery of head 15 (to allow member F to move to open position) and manually adjusted to the inwardly projecting position shown in FIG. 7, in which it bears against the head 15 in recess 16A with a holding action opposing opening movement. Screw 17A is also operable to force member F to the closed position, effecting deformation of cable C.

The essential length of the recess circumferentially (e.g., recess 29B of FIG. 8) is the distance between the remote sides of bores 19, 32, 33 in the closed position of the clamp. Recess 29B and a corresponding recess diametrically opposite thereto in member F, extend full thickness through member F and are formed in the extrusion operation. Recess 29B extends circumferentially from a shoulder 41 at one end of substantiall depth radially, to a tapered opposite end which, in the open position of the clamp, extends beyond the adjacent end of bore 19 a substantial distance, and in the closed position of FIG. 8, remains in full communication with said end of bore 19. Latch tooth 18 in this embodiment is receivable in a notch 40 in arm 23B of female member F.

In all embodiments of the invention, the recesses 28 and/or 29 have a radial depth such as to receive the offset bends 34, 35 formed therein, so that such bends are formed without shearing impingement by the opposed jaws 36, 37, 38, 39.

I claim:

1. In a cable clamp comprising male and female jaw members coupled together for hinging movements between open and closed positions, said jaw members having respective tails projecting in a common direction and adapted to be connected by fastener means to secure the clamp in closed position:
   said male member including a cylindrical trunnion head projecting on one side of its respective tail;
   said female member having a yoke portion comprising diametrically opposed arms and a web extending between and joining said arms;
   said arms and web cooperatively defining a cylindrical socket receiving and journalled on said head;
   said arms embodying respective arcuate cheeks spaced radially from said head's periphery to define recesses located on a diameter of the hinge axis of said clamp;
   said arms having aligned cable-receiving bores on said diameter;
   said head having a diametrical bore adapted to be aligned with said cheek bores in the open position of the clamp so as to receive a cable;
   said cheek bores being offset circumferentially from the ends of said diametrical bore in the closed position of the clamp, whereby to form in said cable a pair of offset bends disposed at the opposite sides of said head and operable to lock the cable to the clamp;
   said recesses having a radial depth such as to receive the offset bend formed therein, so that said bend is formed without shearing impingement by opposed jaws of said male and female members.

2. A cable clamp as defined in claim 1:
both of said arms embodying respective cheeks disposed in diametrically opposed relationship and defining respective recesses at opposite sides of said head.

3. A cable clamp as defined in claim 1:
said recess being disposed midway of the thickness of the respective arm between axially spaced portions of the arm which have internal circumferential surfaces defining portions of said socket.

4. A cable clamp as defined in claim 1:
said recess extending axially entirely through the thickness of the respective arm so as to be open at both sides thereof.

5. A cable clamp as defined in claim 1:
said arms including fingers formed at their ends remote from said web;
said fingers projecting toward one another in alignment with the tail of the female member and having end surfaces fitted to the cylindrical external surface of said head to form portions of said socket.

6. A cable clamp as defined in claim 5:
said head including an integral radially projecting latch tooth engageable against an end of one of said fingers which is an extension of the tail of the female member, so as to hold said female member in an open position with relation to the male member.

7. A cable clamp as defined in claim 6:
said latch tooth being engageable against an end portion of the internal surface of said recess adjacent the end of said one finger when the clamp is in the closed position, whereby to yieldingly maintain said closed position.

8. A cable clamp as defined in claim 1:
both of said arms embodying respective arcuate cheeks defining respective diametrically opposed recesses of crescent shape circumferentially;
said arms having respective fingers at their ends remote from said web, said fingers having respective tip surfaces being against the cylindrical periphery of said head and defining portions of said socket;

said head including an integral radially projecting latch which, in the closed position of the clamp, is engageable against the tip of a respective finger to hold the clamp yieldingly in said closed position and which, in an open position of said clamp, is engageable against an end portion of the arcuate internal surface of the adjacent recess so as to hold the clamp yieldingly in open position;

said latch tooth being engageable with a wedging action against said respective finger to spring it radially away from the periphery of said head to allow movement of the clamp members between said open and closed positions.

9. A cable clamp as defined in claim 8:

said recesses extending entirely through the thickness of the respective arms so as to be open at both sides thereof.

10. A cable clamp as defined in claim 1:

said recess being of truncated crescent configuration, having substantially maximum radial depth at an end which is defined by a substantially radial shoulder and tapers circumferentially from said shoulder to minimum depth at its other extremity;

said recess being located so that, in the open position of the clamp said shoulder substantially registers with one side of the male bore head and the tapered end of the recess projects beyond the other side of said male head bore, whereas, in the clamp's closed position the deeper portion of said recess beginning at said shoulder, is extended past said one side of said male head bore so as to receive the offset bend of the cable formed during the movement from said open position to said closed position.

* * * * *